(12) United States Patent
Nevatia et al.

(10) Patent No.: US 8,577,154 B2
(45) Date of Patent: Nov. 5, 2013

(54) AUTOMATED SINGLE VIEWPOINT HUMAN ACTION RECOGNITION BY MATCHING LINKED SEQUENCES OF KEY POSES

(75) Inventors: Ramakant Nevatia, Pacific Palisades, CA (US); Fengjun Lv, San Jose, CA (US)

(73) Assignee: University of Southern California, Los Angeles, CA (US)

( * ) Notice: Subject to any disclaimer, the term of this patent is extended or adjusted under 35 U.S.C. 154(b) by 1003 days.

(21) Appl. No.: 12/483,050

(22) Filed: Jun. 11, 2009

(65) Prior Publication Data

US 2010/0034462 A1    Feb. 11, 2010

Related U.S. Application Data

(60) Provisional application No. 61/061,905, filed on Jun. 16, 2008.

(51) Int. Cl.
*G06K 9/00* (2006.01)
*G06K 9/62* (2006.01)
*G06K 9/36* (2006.01)
*G06T 13/00* (2011.01)
*H04N 7/18* (2006.01)
*H04N 5/225* (2006.01)

(52) U.S. Cl.
USPC ........... 382/209; 382/103; 382/107; 382/154; 382/236; 345/473; 348/169; 348/155

(58) Field of Classification Search
USPC ................. 382/190, 103, 107, 154, 209, 236; 345/473; 348/169, 155
See application file for complete search history.

(56) References Cited

U.S. PATENT DOCUMENTS

| | | | |
|---|---|---|---|
| 6,606,412 B1 * | 8/2003 | Echigo et al. ................. | 382/224 |
| 2004/0042639 A1 * | 3/2004 | Pavlovic et al. ............. | 382/107 |
| 2009/0016610 A1 * | 1/2009 | Ma et al. ........................ | 382/195 |

OTHER PUBLICATIONS

Mentzelopoulos et al, "Key Frame Extraction Algorithm using Entropy Difference", Oct. 2004, ACM, pp. 39-45.*

(Continued)

*Primary Examiner* — Kathleen Y Dulaney
(74) *Attorney, Agent, or Firm* — McDermott Will & Emery LLP

(57) ABSTRACT

An automated human action recognition system may automatically recognize one or more actions of a human from 2D input image data representing a sequential series of input images of the human performing the one or more actions. Each input image may be from an unknown viewpoint. A computer memory system may contain 2D reference image data representing a plurality of reference actions which a human may perform. The 2D reference image data may include a plurality of linked sequences of key poses, including a linked sequence of key poses for each reference action. For each reference action, each key pose within the linked sequence of key poses for the reference action may consist essentially of 2D image data that is representative of a human figure performing the reference action at a selected point during the reference action. The timing of the selected points within the linked sequence of key poses for the reference action may be based on changes in the position of the human figure during the performance of the reference action. The linked sequence of key poses for the reference action may uniquely distinguish it from the linked sequence of key poses for all of the other reference actions. A computer processing system may be configured to determine which of the reference actions best matches the 2D input image data with no knowledge of the viewpoint of the 2D input image data.

25 Claims, 11 Drawing Sheets

(56) References Cited

OTHER PUBLICATIONS

Wolf, "Key Frame Selection by Motion Analysis", 1996, IEEE, pp. 1228-1231.*

Parameswaran et al, "View Invaraints for Human Action Recognition", 2003 IEEE, pp. 1-7.*

Agarwal, A. et al. 2004. 3D Human Pose from Silhouettes by Relevance Vector Regression. Proceedings of the IEEE International Conference on Computer Vision and Pattern Recognition, pp. 882-888.

Belongie, S. et al. 2002. Shape Matching and Object Recognition Using Shape Contexts. IEEE Transactions on Pattern Analysis and Machine Intelligence, Apr. 2002, vol. 24, No. 4, pp. 509-522.

Blank, M. et al. 2005. Actions as space-time shapes. In Proceedings of the IEEE International Conference on Computer Vision, Beijing, China, Oct. 2005, pp. 1395-1402.

Bobick, A.F. et al. 2001. The recognition of human movement using temporal templates. IEEE Transactions on Pattern Analysis and Machine Intelligence, Mar. 2001, vol. 23, No. 3, pp. 257-267.

Elgammal, A. et al. 2004. Inferring 3D body pose from silhouettes using activity manifold learning. In Proceedings of the IEEE International Conference on Computer Vision and Pattern Recognition, pp. 681-688.

Grauman, K. et al. 2005. The pyramid match kernel: discriminative classification with sets of image features. In Proceedings of the IEEE International Conference on Computer Vision, Beijing, China, Oct. 2005, pp. 1458-1465.

Grauman, K. et al. 2006. Approximate Correspondences in High Dimensions. NIPS: Proceedings of Conference on Advances in Neural Information Processing Systems, MIT Press, 8 pages.

Ke, Y. et al. 2005. Efficient Visual Event Detection using Volumetric Features, Proceedings of the IEEE International Conference on Computer Vision, Beijing, China, Oct. 2005, pp. 166-173.

Kehl, R. et al. 2005. Full Body Tracking from Multiple Views Using Stochastic Sampling, Proceedings of the IEEE International Conference on Computer Vision and Pattern Recognition, pp. 129-136.

Laptev, I. et al. 2003. Space-time interest points, Proceedings of the IEEE International Conference on Computer Vision, pp. 432-439.

Lee, M.W. et al. 2004. Proposal Maps Driven MCMC for Estimating Human Body Pose in Static Images. In Proceedings of the IEEE International Conference on Computer Vision and Pattern Recognition, pp. 334-341.

Rabiner, L.R. 1989. A tutorial on Hidden Markov Models and Selected Applications in Speech Recognition. Proceedings of the IEEE, Feb. 1989, vol. 77, No. 2, pp. 257-286.

Ramanan, D. et al. 2003. Automatic Annotation of Everyday Movements. NIPS: Proceedings of Conference on Advances in Neural Information Processing Systems, MIT Press, 8 pages.

Shakhnarovich, G. et al. 2003. Fast Pose Estimation with Parameter-Sensitive Hashing. In Proceedings of the Ninth IEEE International Conference on Computer Vision (ICCV 2003), pp. 750-757.

Sminchisescu, C. et al. 2005. Conditional models for contextual human motion recognition. In Proceedings of the IEEE International Conference on Computer Vision, Beijing, China, Oct. 2005, pp. 1808-1815.

Stauffer, C. et al. 1999. Adaptive background mixture models for real-time tracking. In Proceedings of the IEEE International Conference on Computer Vision and Pattern Recognition, pp. 246-252.

Weinland, D. et al. 2006. Free Viewpoint Action Recognition using Motion History Volumes. Journal of Computer Vision and Image Understanding (Elsevier), vol. 103, Nos. 2-3, pp. 249-257.

Yilmaz, A. et al. 2005. Actions sketch: a novel action representation. In Proceedings of the IEEE International Conference on Computer Vision and Pattern Recognition, pp. 984-989.

* cited by examiner (a) Camera 1  (b) Camera 2  (c) Camera 3  (d) Camera 4  (e) Camera 5

AUTOMATED SINGLE VIEWPOINT HUMAN ACTION RECOGNITION BY MATCHING LINKED SEQUENCES OF KEY POSES

CROSS-REFERENCE TO RELATED APPLICATION(S)

This application is based upon and claims priority to U.S. Provisional Patent Application No. 61/061,905, entitled "VIEW INVARIANT HUMAN ACTION RECOGNITION AND SEGMENTATION SYSTEM," filed Jun. 16, 2008. The entire content of this application is incorporated herein by reference.

STATEMENT REGARDING FEDERALLY SPONSORED RESEARCH

This invention was made with government support under Contract No. N00014-06-1-0470 awarded by the Office of Naval Research. The government has certain rights in the invention.

BACKGROUND

1. Technical Field

This disclosure relates to automatically recognizing one or more actions of a human.

2. Description of Related Art

Recognizing basic human actions (e.g. walking, sitting down, and waving hands) from a monocular view may be important for many applications, such as video surveillance, human computer interaction, and video content retrieval.

Some research efforts focus on recovering human poses. See A. Agarwal, B. Triggs, "3D Human Pose from Silhouettes by Relevance Vector Regression", *CVPR, pp.* 882-888, 2004; A. Elgammal, C. S. Lee, "Inferring 3D body pose from silhouettes using activity manifold learning", *CVPR, pp.* 681-688, 2004; and M. W. Lee, I. Cohen, "Proposal Maps Driven MCMC for Estimating Human Body Pose in Static Images", *CVPR*, pp. 334-341, 2004. This may be a necessary step for view-invariant human action recognition. However, 3D pose reconstruction from a single viewpoint may be difficult. A large number of parameters may need to be estimated and ambiguity may be caused by perspective projection.

Alternatively, example based methods may store a database of example human figures with known 3D parameters. See D. Ramanan, D. A. Forsyth, "Automatic Annotation of Everyday Movements", *NIPS,* 2003; and G. Shakhnarovich, P. Viola, T. Darrell, "Fast Pose Estimation with Parameter-Sensitive Hashing", *ICCV,* pp. 750-757, 2003. A 3D pose may be estimated by searching for examples similar to the input image. Comparisons with known examples may be easier than inferring unknown parameters. However, good coverage in a high dimensional parameter space may need a large number of examples. The difficulty in getting enough examples may make the pose recovered not highly accurate.

2D approaches to action recognition have also been proposed. See M. Blank, L. Gorelick, E. Schetman, M. Irani, R. Basri, "Actions as space-time shapes", *ICCV*, pp. 1395-1402, 2005; A. F. Bobick, J. W. Davis, "The recognition of human movement using temporal templates", *PAMI* 23(3), pp. 257-267, 2001; Y. Ke, R. Sukthankar, M. Hebert, "Efficient Visual Event Detection using Volumetric Features", *ICCV*, pp. 166-173, 2005; I. Laptev, T. Lindeberg, "Space-time interest points", *ICCV*, pp. 432-439, 2003; and A. Yilmaz, M. Shah, "Actions sketch: a novel action representation", *CVPR*, pp. 984-989, 2005. These approaches may be roughly grouped as space-time shape based, see M. Blank, L. Gorelick, E. Schechtman, M. Irani, R. Basri, "Actions as space-time shapes", *ICCV, pp.* 1395-1402, 2005; and A. Yilmaz, M. Shah, "Actions sketch: a novel action representation", *CVPR,* pp. 984-989, 2005; interest point based, see Y. Ke, R. Sukthankar, M. Hebert, "Efficient Visual Event Detection using Volumetric Features", *ICCV,* pp. 166-173, 2005; and I. Laptev, T. Lindeberg, "Space-time interest points", *ICCV*, pp. 432-439, 2003; and motion template based, see A. F. Bobick, J. W. Davis, "The recognition of human movement using temporal templates", *PAMI* 23(3), pp. 257-267, 2001. They may work effectively under the assumption that the viewpoint is relatively fixed (e.g., from frontal or lateral view), and, in some cases, with small variance.

The lack of a view-invariant action representation may limit the applications of such 2D based approaches. To address this limitation, some approaches may resort to using multiple cameras. See A. F. Bobick, J. W. Davis, "The recognition of human movement using temporal templates", *PAMI* 23(3), pp. 257-267, 2001.

A truly view-invariant approach may need knowledge of 3D human poses, which can be robustly recovered from multiple views. See R. Kehl, M. Bray, L. J. Van Gool, "Full Body Tracking from Multiple Views Using Stochastic Sampling", *CVPR*, pp. 129-136, 2005; and D. Weinland, R. Ronfard, and E. Boyer, "Free Viewpoint Action Recognition using Motion History Volumes", *CVIU*, 103(2-3), pp. 249-257, 2006. A more challenging problem can be to recover 3D poses from a single view. Some methods may learn a direct mapping from the image feature space (e.g. silhouette) to the parameter space (e.g. 3-D pose) using techniques such as regression, see A. Agarwal, B. Triggs, "3D Human Pose from Silhouettes by Relevance Vector Regression", *CVPR*, pp. 882-888, 2004, or manifold embedding, see A. Elgammal, C. S. Lee, "Inferring 3D body pose from silhouettes using activity manifold learning", *CVPR*, pp. 681-688, 2004. However, such mapping may be multi-valued, and it may be difficult for direct mapping to maintain multiple hypotheses over time. Other approaches may directly explore through the parameter space and search for an optimal solution. See M. W. Lee, I. Cohen, "Proposal Maps Driven MCMC for Estimating Human Body Pose in Static Images", *CVPR*, pp. 334-341, 2004. Due to the high dimensionality, such approaches may use sampling based techniques and look for image evidences to guide the sampler, but the computational complexity may still be very high.

Some approaches to the pose tracking or the action recognition task use graph models, such as Hidden Markov Models, to exploit temporal constraints. See D. Ramanan, D. A. Forsyth, "Automatic Annotation of Everyday Movements", *NIPS,* 2003; *Conditional Random Fields*; C. Sminchisescu, A. Kanaujia, Z. Li, D. Metaxas, "Conditional models for contextual human motion recognition", *ICCV*, pp. 1808-1815, 2005.

SUMMARY

An automated human action recognition system may automatically recognize one or more actions of a human from 2D input image data. The 2D input data may represent a sequential series of input images of the human performing the one or more actions from the same viewpoint. A computer memory system may contain 2D reference image data representing a plurality of reference actions which a human may perform. The 2D reference image data may include a plurality of linked sequences of key poses, including a linked sequence of key poses for each reference action. For each reference action, each key pose within the linked sequence of key poses for the reference action may consist essentially of 2D image data that is representative of a human figure performing the reference action at a selected point during the reference action. The timing of the selected points within the linked sequence of key poses for the reference action may be based on changes in the position of the human figure during the performance of the reference action. The linked sequence of key poses for the reference action may uniquely distinguish it from the linked sequence of key poses for all of the other reference actions. A computer processing system may be configured to determine which of the linked sequences best matches the 2D input image data.

The selected points for the key poses within the linked sequence for at least one of the reference actions may not be equally spaced in time.

At least one of the key poses may be contained within a plurality of the linked sequences.

Each linked sequence for each of the reference actions may contain less than ten key poses.

The computer processing system may be configured to automatically select each selected point. The computer processing system may be configured to automatically select each selected point by analyzing three-dimensional image data that is representative of a human figure performing each of the reference actions. The computer processing system may be configured to correlate each selected point with a time when computed motion energy of the human figure during the performance of each reference action is at a peak or at a valley. The computer processing system may be configured to cause the sequence of the selected points in each linked sequence for each reference action to alternate between a time when the computed motion energy is at a peak and a time when the computed motion energy is at a valley.

The linked sequences may include linked sequences of key poses for each reference action from different viewpoints. The different viewpoints may be from the same location, but at different pans and/or tilts.

The computer processing system may be configured to determine which linked sequence best matches the 2D input image data with no knowledge of the viewpoint of the 2D input image data.

Each linked sequence of key poses may include a link from each key pose within the linked sequence to itself.

The linked sequence of key poses for one of the reference actions may include a link from the key pose at the end of the reference action to the key pose at the beginning of the reference action. The reference action may be one that repeats in real life.

One of the linked sequences may include a link between the key pose at the end of a linked sequence for a first of the reference actions to the key pose at the beginning of another linked sequence for a second of the reference actions. The second reference action may follow the first reference action in real life.

Each of the linked sequences of key poses for each of the reference actions may include a link to another linked sequence of key poses for the same reference action, but from a neighboring viewpoint.

The human figure may be a synthesized human figure.

The 2D data for each key pose may be representative of a silhouette of the human figure.

The scale and translation of each silhouette may have been normalized in the 2D data for each pose.

The computer processing system may be configured to determine which of the linked sequences best matches the 2D input image data by, in part, determining how well each input image matches each key pose. The computer processing system may be configured to utilize a modified PMK algorithm to determine how well each input image matches each key pose.

Each input image and each key pose may be represented by 2D data that provides a value for each of a plurality of characteristics of the image. The modified PMK algorithm may use a scale factor in connection with each characteristic for both images that is based on the range of values for that characteristic.

The computer processing system may be configured to utilize the Viterbi algorithm in determining which of the linked sequences best matches the 2D input image data.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

DETAILED DESCRIPTION OF ILLUSTRATIVE EMBODIMENTS

Figure 1:
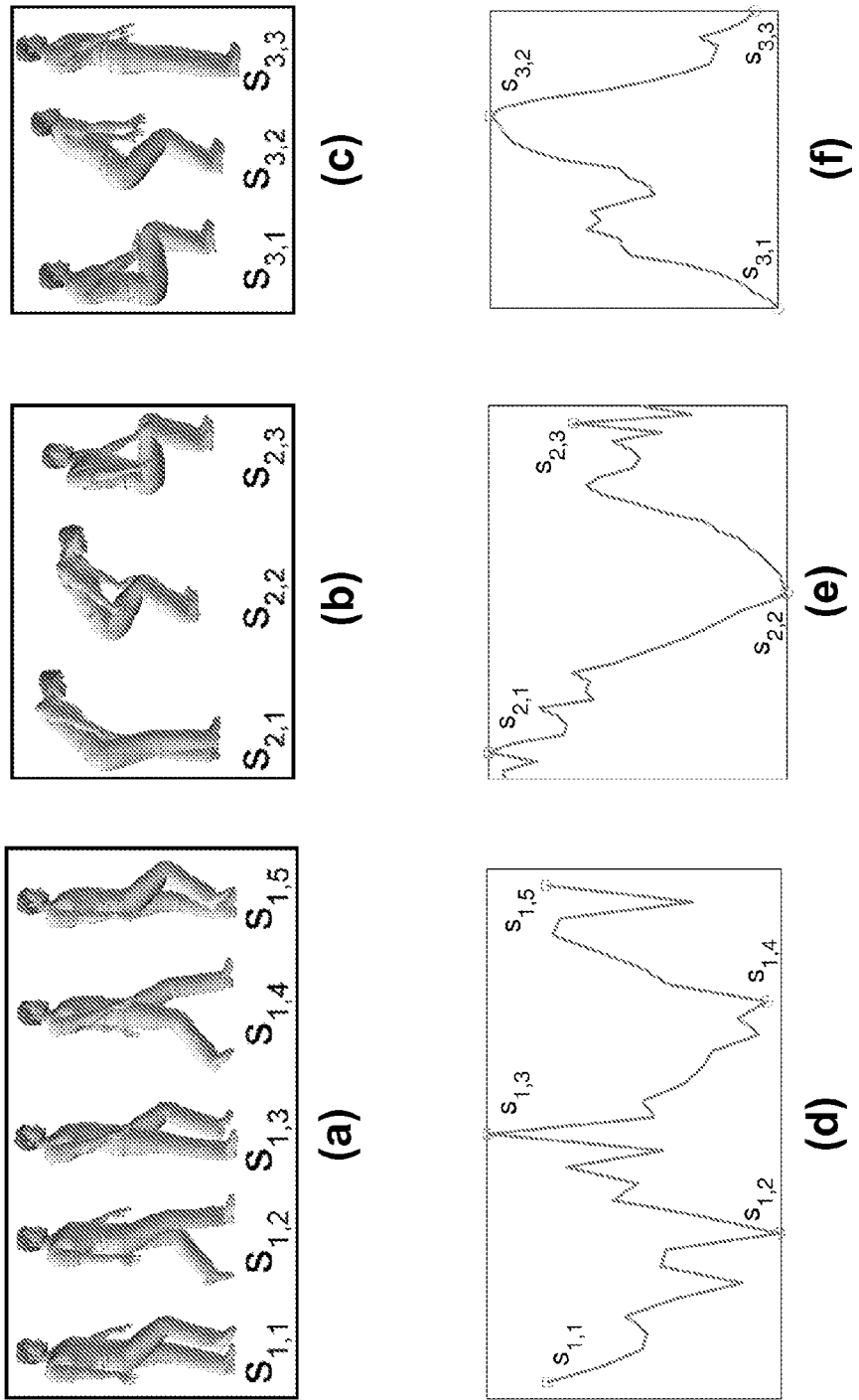
FIG. 1(a) illustrates key poses of a human figure walking.
FIG. 1(b) illustrates key poses of a human figure sitting down
FIG. 1(c) illustrates key poses of a human figure standing up.
FIG. 1(d) illustrates motion energy of the human figure walking in FIG. 1(a).
FIG. 1(e) illustrates motion energy of the human figure sitting down in FIG. 1(b).
FIG. 1(f) illustrates motion energy of the human figure standing up in FIG. 1(c).

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Introduction

Rough estimates of poses may be sufficient to infer human actions by taking advantage of contextual constraints imposed by actions. Such constraints may be three-fold: First, the occurrence of poses within an action may follow some specific order. In "walking" for example, two-leg crossing may occur between left-leg stepping and right-leg stepping. Second, transitions between different actions may not be arbitrary. For example, "sitting" may not become "walking" without "standing-up" in between. Third, change in a human's orientation may be smooth. By taking advantage of these contextual constraints, many short-term errors caused by image noises and perspective ambiguity may be eliminated.

An example based action recognition system may impose such constraints. These constraints may be inherently modeled using an action representation scheme which is referred to herein as Action Net. Action Net may be a graph model. Each node in the Action Net may contain the 2D representation of one view of an example 3D pose called a key pose. Each link may specify the possible transition of key poses within an action class or across different action classes.

In a learning phase, key poses of each action class may be extracted from a small set of motion capture sequences. This may be done manually or automatically. The key poses may capture the essence of each action class, even if there is variance in execution styles of the same action. The Action Net may be manually or automatically constructed by connecting actions having similar boundary key poses. The key poses may be rendered from a variety of viewpoints using POSER, a human character animation software, to generate synthetic realistic looking human figures. The Shape Context of the human silhouette may be computed as the 2D representation of a human figure and stored in each node of the Action Net. technique may be used, such as those set forth in S. Belongie, J. Malik, J. Puzicha, "Shape Matching and Object Recognition Using Shape Contexts," *PAMI* 24(4), pp. 509-522, 2002.

During recognition, the human silhouette in each input frame may be extracted based on background subtraction or any other technique. The shape context of the human silhouette may be matched with all nodes in the Action Net using a modified Pyramid Match Kernel (PMK) algorithm. The speed of PMK may allow a large number of viewpoints to be covered in near real time.

In the original PMK algorithm, two sets of high dimensional features may tend to get a low matching score regardless of their similarity. See K. Grauman, T. Darrell, "The pyramid match kernel: discriminative classification with sets of image features", *ICCV*, pp. 1458-1465, 2005. This problem may be fixed by using a different feature space partitioning scheme. The action recognition (including segmentation) problem may be solved by finding the most likely sequence of nodes within the Action Net, which may be achieved by applying the Viterbi algorithm. See L. R. Rabiner, "A tutorial on Hidden Markov Models and selected applications in speech recognition", In *Proc. of the IEEE,* 77(2):257-286, 1989.

Action Representation

Human action may be characterized by a spatial element, which may be the body pose at each time step, and by a temporal element, which may be the evolution of the body poses over time. Instead of including all frames of body poses, a more compact representation of a human action may be provided. For example, the following poses may suffice to describe a walking action: {two legs crossing→right leg forward→two legs crossing→left leg forward→two legs crossing}, as shown in FIG. 1(a). In FIGS. 1(b) and 1(c), a "sitting down" and a "standing up" action may be clearly observed with only three poses each. Such poses may be termed key poses. An action class may be modeled as a linked sequence of key poses.

Because actions are recognized by comparison with known action models, a small number of key poses may reduce the computational complexity. By focusing on the key poses only, the essence of an action class may be captured, even if there is variance in execution styles of the same action.

Automatic Extraction of 3D Key Poses 3D motion capture data may be used to obtain the key poses. A small set of motion capture sequences may be manually selected for each action class. Different styles for the same action type (e.g. "sitting on the ground" v. "sitting on a chair") may be treated as different action classes. Sequences of the same action class may be aligned using any technique, such as the Dynamic Time Warping algorithm, which may find an optimal alignment between variable length sequences. See C. S. Myers, L. R. Rabiner, "A comparative study of several dynamic time-warping algorithms for connected word recognition", The Bell System Technical Journal, 60(7): 1389-1409, 1981.

The averaged sequence for one action class may contain a series of 3D body joint positions $\{P_{i,j}=(x_{i,j}, y_{i,j}, z_{i,j})\}$ where i and j are the frame index and the joint index, respectively. The motion energy at the i-th frame may be defined as:

$$E_i = \sum_{j=1}^{n} |P_{i,j} - P_{i-1,j}|^2$$

where |·| denotes Euclidean distance and n is the number of body joints.

Key poses may be defined as the poses with maximum or minimum motion energy within a sliding window, i.e. $E_i$ equals $$\max_{i'=i-L}^{i+L} E_{i'} \text{ or } \min_{i'=i-L}^{i+L} E_{i'},$$

where L is half the length of the sliding window centered at the current frame i.

The 3D key poses shown in FIGS. 1(a)-1(c) (from the lateral view) may be actual results obtained this way. The corresponding change of motion energy in each sequence is shown in FIGS. 1(d)-1(e), respectively, in which the positions of these key poses are also marked. L may equal 15 frames or any other number of frames. An L of 15 may result in an average of about four key poses for each action class. All action classes may have less than 10 key poses or less than another number, such as 20, 15, 8, 6, 5, or 4.

Generation of an Action Net

Figure 2:
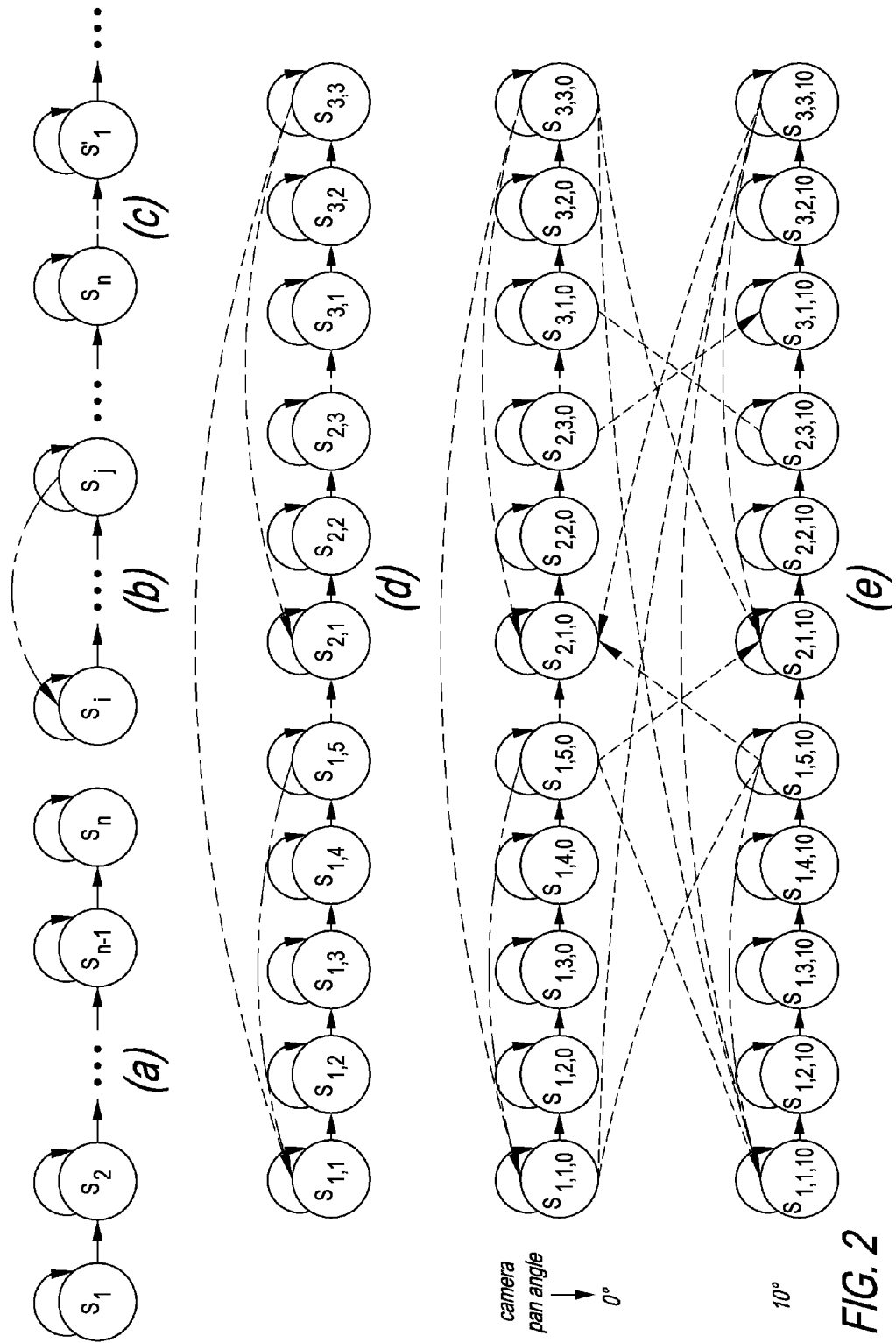
FIG. 2(a) illustrates a linked sequence of key poses of a single action, as well as key poses linked to themselves.
FIG. 2(b) illustrate a linked sequence of key poses of a single action in which the last key pose is linked to the first key pose.
FIG. 2(c) illustrate a linked sequence of key poses in which a key pose at the end of a first action is linked to a key pose at the beginning of a second action.
FIG. 2(d) illustrates the linked sequences of key poses in FIGS. 1(a)-1(c) linked together in an Action Net.
FIG. 2(e) illustrates an unrolled version of the Action New in FIG. 2(d) from two different viewpoints.

An action class may be modeled as a linked chain of extracted key poses, as shown in FIG. 2(a). Each node (state) in this graph model may correspond to one key pose. In graph models, observation nodes may be observed directly by the outside world and state nodes may emit the observations according to some probability distribution. State nodes may not be observed directly (so called hidden) by the outside world and may need to be estimated from the observations.

There may be other types of connectivity. For example, a back-link may backwardly connect two states in the same model, as shown in FIG. 2(b). Back-links may be useful to model periodic actions, such as walking and hand waving, in which a motion is repeated. The number of repetitions may vary.

Inter-links may link one action to another, as shown in FIG. 2(c). One example is to inter-link the end of one action to the beginning of another action which may follow in real life. During action recognition, inter-links may be used to rule out unlikely transitions between different action models. Both back-links and inter-links may be automatically determined based on the similarity between two 3D key poses, i.e. pose I can connect to pose j iff $|pose_i - pose_j| \leq \delta$.

By connecting different action models, a more complex graph model may be built, called herein an Action Net. FIG. 2(d) is an example. An Action Net may provide long-term contextual constraints for action recognition and segmentation. The links within an action model may specify the order of the key poses and the links across action models may constrain the possible action transitions.

Pose Representation in 2D

Key poses may be defined in 3D using 3D image data. However, the input of the system may be a video, which may provide only 2D image data. If so, 3D poses may be inferred from the video. However, this may be difficult. Alternatively, all 2D views for each 3D key pose may be stored.

It may not be practical to cover all viewpoints. However, it may be feasible to cover a large number of viewpoints and make observation differences between adjacent viewpoints small. Even so, collecting multiple-view action data from real videos may be a formidable task.

A more practical way may be to use synthetic human figures. For example, software for generating realistic looking human characters may be used to render key poses from a variety of viewpoints, such as POSER 5 from Curious Labs (now e frontier Inc.). 90° of camera tilt angle may be covered at 5° intervals, and 360° of pan angle may be covered at 10° intervals. This may result in a total of 19×36=684 images for each pose.

From a stationary camera, the tilt angle may be fixed. If tilt is given during recognition (e.g. from camera calibration), only 36 images may need to be searched for each pose rendered from the given tilt angle.

Pan angle may not be assumed because the orientation of the actor may be unknown, which may be equivalent to an unknown pan angle.

The roll angle may control image rotation. A rotation invariant representation of 2D poses is described below.

The silhouette of a human may be selected as the image observation for a 2D pose. See S. Belongie, J. Malik, J. Puzicha, "Shape Matching and Object Recognition Using Shape Contexts", *PAMI* 24(4), pp. 509-522, 2002; M. Blank, L. Gorelick, E. Shechtman, M. Irani, R. Basri, "Actions as space-time shapes", *ICCV*, pp. 1395-1402, 2005; A. F. Bobick, J. W. Davis, "The recognition of human movement using temporal templates", *PAMI* 23(3), pp. 257-267, 2001; A. Elgammal, C. S. Lee, "Inferring 3D body pose from silhouettes using activity manifold learning", *CVPR*, pp. 681-688, 2004; R. Kehl, M. Bray, L. J. Van Gool, "Full Body Tracking from Multiple Views Using Stochastic Sampling", *CVPR*, pp. 129-136, 2005; and A. Yilmaz, M. Shah, "Actions sketch: a novel action representation", *CVPR*, pp. 984-989, 2005.

A silhouette may contain rich shape information of a 2D pose. It may also be easier to extract a human contour (e.g. from background subtraction) than to detect body parts. A silhouette may be insensitive to internal texture and color. Some drawbacks may include the dependency on the quality of foreground segmentation and ambiguity caused by loss of internal detail. These issues may be overcome to some extent by using robust background subtraction algorithms, such as Mixture of Gaussian, and considering the contextual constraints, as described above. See C. Stauffer, W. E. L. Grimson, "Adaptive background mixture models for real-time tracking", *CVPR*, pp. 246-252, 1999.

Another issue may be occlusion. In one implementation, only one person may be in the scene or, if there are multiple persons, separate silhouettes may be used. Thus, mutual occlusion may not be present.

The Shape Context (SC) of silhouettes may be used to obtain a robust scale and translation invariant shape representation. See S. Belongie, J. Malik, J. Puzicha, "Shape Matching and Object Recognition Using Shape Contexts", *PAMI* 24(4), pp. 509-522, 2002. Shape context is a local histogram centered at each contour point with respect to all other contour points. For example, a contour may have 1000 points and each histogram may have 12 angular and 5 radial bins. Then there may be 1000 shape context features and each may be 60 D. Shape Context may be translation invariant because all these may be relative to the contour itself instead of absolute coordinates.

Every radial index may be normalized by the average distance among all pairs of contour points. For an average distance L from the inner circle to the outer circle, for example, the radial index means <=1 L, 1 L< and <=2 L, 2 L< and <=3 L, etc. Even if L is very large, after normalization, the index may remain the same. So it may be scale invariant. In practice, log-coordinate may be used.

Figure 3:
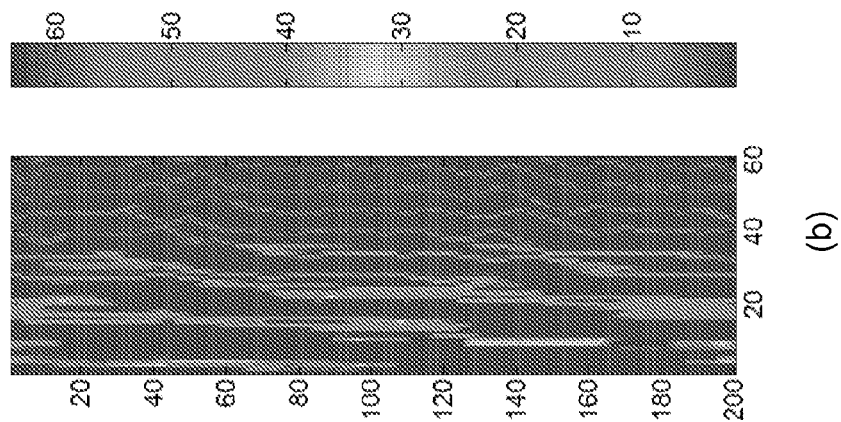
FIG. 3(a) illustrates a shape context of a human silhouette with an end point at the origin.
FIG. 3(b) illustrates the shape context of the silhouette in FIG. 3(a) represented as a matrix.

FIG. 3(a) illustrates a shape context of each sampled edge point of a silhouette which may be a log-polar histogram of the coordinates of the rest of the point set measured using the reference point as the origin. Because only relative scale and position may be used, the representation may be invariant to scale and translation. The shape context of a silhouette may therefore be represented by 200 feature points in a 60-dimensional space, or more intuitively, a 200×60 matrix, as shown in FIG. 3(b). Different bin shapes and/or numbers of bins may instead be used.

To obtain image rotation invariance, the principal axis of the silhouette using the second-order moments may be computed. See K. R. Castleman, "Digital Image Processing", Prentice Hall, pp. 494-496, 1996. Before computing shape context, the rotation angle of the principal axis may be compensated so that the principal axis is vertical.

Unrolled Action Net

The Action Net described above may be "unrolled" to model changes in the actor's orientation. Each action model in the Action Net may be unrolled several times, such as 36 times, representing the same action rendered from different camera pan angles (assuming tilt angle is given).

In an unrolled Action Net, action model i may inter-link to action model j iff (1) there is an inter-link (including self-loop) from i to j in the original Action Net and (2) they are rendered from the same or adjacent viewpoints (i.e. difference in pan angle is less than 10°).

For example, an unrolled version of the Action Net in FIG. 2(d) is shown in FIG. 2(e). An additional subscript has been added to each node in the figure to represent the pan angle. The complete graph may be quite complex, so only the first two pan angles (0° and 10°) are shown. The dotted links are inter-links that connect action models rendered from adjacent viewpoints. These inter-links may allow modeling gradual change in the actor's orientation.

Action Recognition and Segmentation

During recognition, human blobs in input frames may be segmented using any technique, such as background subtraction, and silhouettes of these blobs may be extracted. The shape context of each silhouette may be matched with all nodes in an unrolled Action Net. The matching results may then be considered as a whole by taking advantage of the contextual constraints imposed by the Action Net to get a robust action recognition result.

Fast Pose Matching

Due to the large number of comparisons, a fast pose matching algorithm may be used. One such algorithm is the Pyramid Match Kernel (PMK) algorithm. PMK is a feature set matching algorithm proposed by Grauman and Darrell. See K. Grauman, T. Darrell, "The pyramid match kernel: discriminative classification with sets of image features", *ICCV*, pp. 1458-1465, 2005. PMK may achieve comparable results at a significantly lower computational cost than other approaches. PMK may work with unordered features, which may fit the shape context features.

Instead of directly comparing features in two feature sets, PMK may calculate intersections over multi-resolution histograms, which may give a linear complexity in the number of features. The similarity between the two sets may be defined by the weighted sum of histogram intersections at each level. The weights may be proportional to the resolution of each level, as shown in this equation:

$$K_\Delta(\overline{\Psi(X), \Psi(Y)}) = \sum_{l=0}^{L} \frac{1}{2^i} \underbrace{(\tau(H_i(X), H_i(Y)) - \tau(H_{i-1}(X), H_{i-1}(Y)))}_{\text{number of newly matched pairs at level } i}$$

where the notations may be as follows: (1) X,Y: feature sets; (2) ψ (X): histogram pyramid of X;

(3) $\frac{1}{2^i}$: weight at level i;

weight at level i; (4) Hi(X): histogram of X at level i; (5) τ( ): The size of intersection of two sets.

Figure 4:
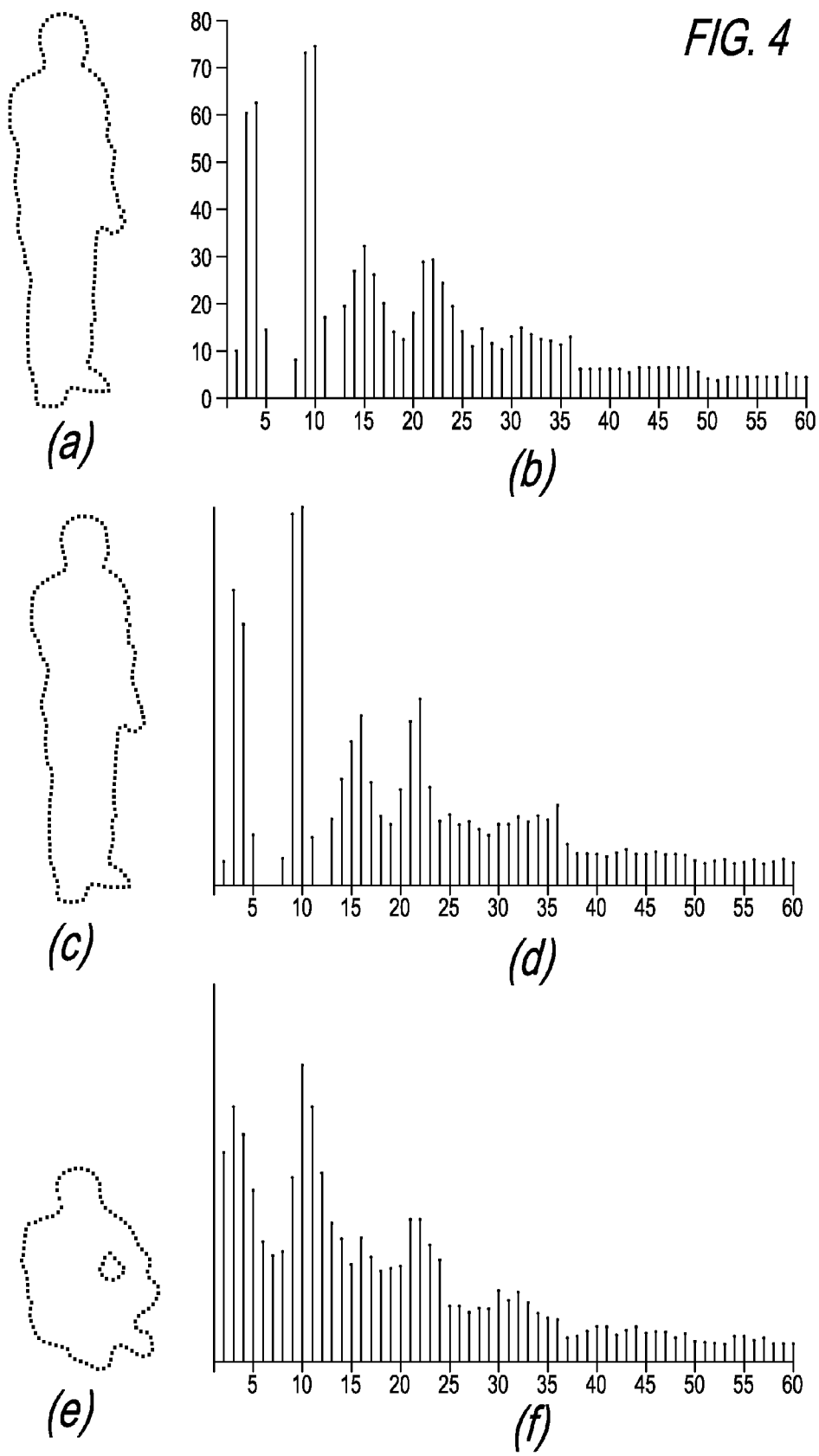
FIG. 4(a) illustrates a reference silhouette image.
FIG. 4(b) illustrates a range of feature point coordinates in each dimension of a shape context space of the reference silhouette image in FIG. 4(a).
FIG. 4(c) illustrates a first input/query silhouette image.
FIG. 4(d) illustrates a range of feature point coordinates in each dimension of a shape context space of the first input/query silhouette image in FIG. 4(c).
FIG. 4(e) illustrates a second input/query silhouette image.
FIG. 4(f) illustrates a range of feature point coordinates in each dimension of a shape context space of the second input/query silhouette image in FIG. 4(e).

When applied to high-dimensional features, such as shape contexts, PMK may produce a low matching score, even when two silhouettes are quite similar. FIG. 4 is an example. When FIG. 4(c) and FIG. 4(e) (two query silhouettes) are compared to FIG. 4(a) (the reference silhouette), a much higher matching score is expected from FIG. 4(c) because of its similar shape to the reference silhouette. But it turns out that both queries may get low scores, and the first one may only be slightly higher.

Figure 5:
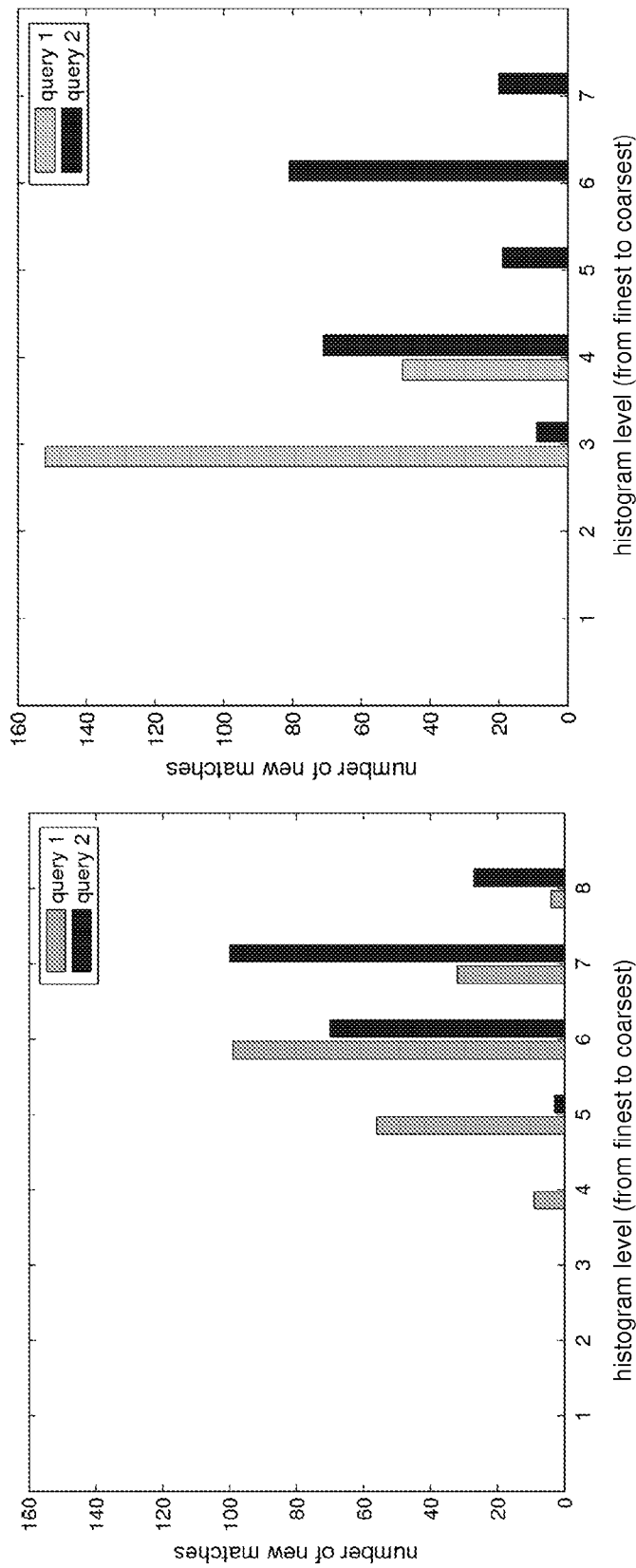
FIG. 5(a) illustrates newly matched pairs of feature point coordinates between the reference coordinates in FIG. 4(b) and the first and second input/query coordinates in FIGS. 4(d) and 4(f), respectively, using the PMK algorithm.
FIG. 5(b) illustrates newly matched pairs of feature point coordinates between the reference coordinates in FIG. 4(b) and the first and second input/query coordinates in FIGS. 4(d) and 4(f), respectively, using a modified PMK algorithm.

FIG. 5(a) shows the number of newly matched pairs between the reference silhouette and the query silhouette at each level of the histograms. Large-scale matches may occur only at the last several coarsest levels for both queries. Because the weights associated with theses levels may be very small (the weights may decrease exponentially with the level), the overall matching scores may be small in both cases. A further explanation may be that a limited number of feature points may usually scatter sparsely in a high-dimensional feature space, so at the finest levels, the probability of points falling into the same bin may be small.

Grauman and Darrell propose to use hierarchical k-means clustering to partition the high-dimensional feature space into a hierarchy of non-uniformly shaped bins. See K. Grauman, T. Darrell, "Approximate Correspondences in High Dimensions", *NIPS*, 2006. However, the features may be so sparse (200 points in a 60-D space) that they may not exhibit apparent aggregation, so it may be hard to decide the proper number of clusters.

Enhancement may instead be based on the observation that the shape context features may not be distributed in a hypercubic space. In fact, data points may spread more sparsely along some dimensions than others. FIGS. 4(b), 4(d), and 4(f) are examples. More intuitively, a stripe-shaped cloud of data points may be in a 2D space. The original PMK may partition the space using a set of square bins. When the side length of bins doubles at each coarser level, points may quickly converge along the short side of the stripe. However, since the resizing speed may be the same for both sides, it may take longer time for the long side of the stripe to converge. In this sense, the long side of the stripe may prevent matching at the finest levels.

Figure 6:
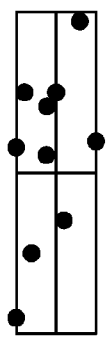
FIGS. 6(a) and 6(b) illustrate uniform partitioning results using the PMK algorithm.
FIGS. 6(c) and 6(d) illustrate striped-shaped partitioning results using a modified PMK algorithm.
Figure 6:
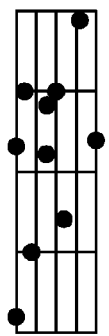
Figure 6:
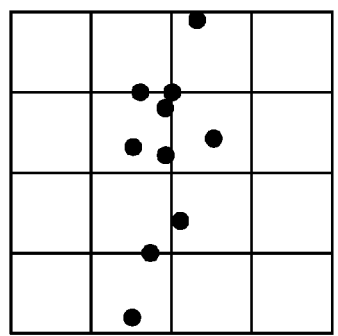
Figure 6:
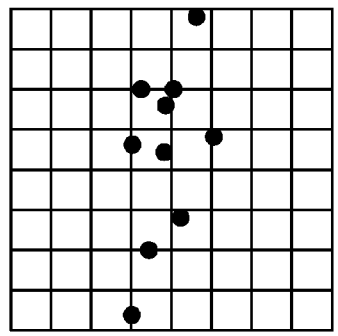

This distribution and force data points may be used to advantage to converge faster along these "long sides." Instead of using a common scale factor for all dimensions, a different scale factor may be assigned for each dimension based on the range of data in this dimension, so that data points converge at the same speed in all dimensions. This may result in a non-uniform partitioning in the feature space. This approach is termed herein as PMK-NUP, and is illustrated and compared with the original PMK in FIG. 6.

Consider a set of n feature points in a d-dimensional space: $\{(x_{1,1}, \ldots x_{1,d}), \ldots, (x_{n,1}, \ldots x_{n,d})\}$. The range of these points in the j-th dimension may be:

$$r_j = \max_{i=1}^{n}(x_{i,j}) - \min_{i'=1}^{n}(x_{i',j}) \quad j = 1, 2, \ldots d$$

Suppose that the k-th dimension has the smallest value of range $r_{min}$. Considering only the k-th dimension, the original PMK (with a scale factor of 2) may take $\log_2 4_{min}$ steps to converge to a single bin. For another dimension j, in order to converge at the same speed, $s_j$, the scale factor the j-th dimension, may have to satisfy $\log_{s_j} r_j = \log_x 4_{min}$, and thus $$s_j = \max\left(r_j^{\frac{1}{\log_2 r_{min}}}, 2\right)$$

A lower bound of 2 may be imposed for $s_j$ so that points will not converge too slowly along the j-th dimension.

$r_{min}$ may be very small and thus result in large scale factors for all dimensions. That may force points to converge to a single bin in all dimensions immediately. So a lower bound of 8 may be imposed on $r_{min}$.

$$r_{min} = \max(\min_{j=1}^{n}(r_j), 8)$$

PMK may be changed to PMK-NUP as follows: when a bin is being resized, the scale factor $s_j$ (instead of 2) may be applied to the j-th side of the bin. The scale factors may be computed based on the reference silhouette. The same scale factors may be applied to the query silhouette when it is compared to the reference silhouette.

PMK-NUP appears to also increase the matching score between two different silhouettes, but not as much as the increase between two similar silhouettes. This may be because different silhouettes have different distributions. FIG. 4 is an example. The ranges in some dimensions of the "sitting" silhouette may be significantly larger than the same dimensions of the "standing" silhouettes. Because the partitioning is based on the reference silhouette, those dimensions may converge at a much lower speed in the "sitting" query, which may end up preventing large-scale matches in the finest levels. The newly matched pairs of two query silhouettes using the original PMK and PMK-NUP may be compared, as shown in FIGS. 5(a) and 5(b), respectively. With PMK-NUP, large-scale matches may take place earlier in both queries, but the difference between the two queries may actually be enlarged.

Searching for the Best Action Sequence

Suppose there are N nodes in the unrolled Action Net and T frames in the input video. After the previous step, an N×T array of matching scores may be obtained. To find out which action is being performed at the i-th frame, the simplest solution may be to assign the action label from the best matched key pose for the i-th frame. However, this solution may be oversimplified because it may overlook the following issues. (1) Silhouettes may be easily distorted by a bad foreground segmentation; (2) Even if silhouettes are clean, different actions may share similar 3D poses and different 3D poses may get similar silhouettes (from specific viewpoints); (3) Because only a small set of key poses may be used, some input silhouettes may not find a good match anyway and thus the matching results for these silhouettes may be left undefined. All these issues indicate that a decision based on an individual matching score may be unreliable.

Figure 7:
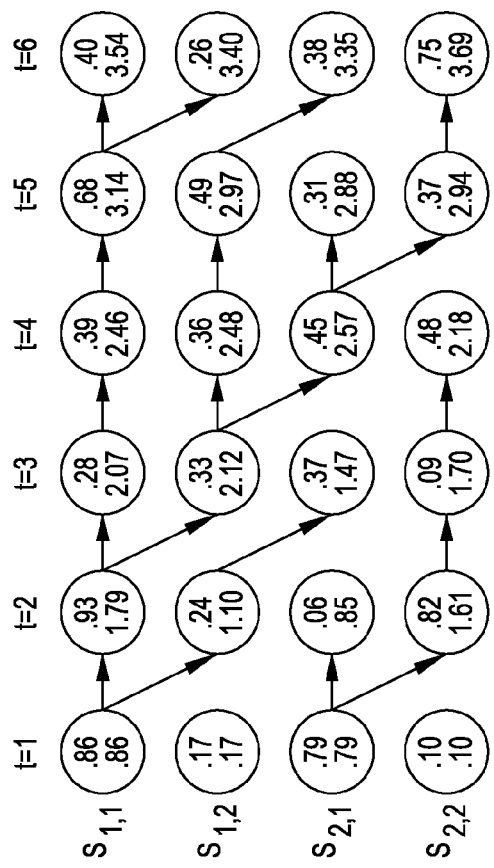
FIG. 7 illustrates action recognition and segmentation using the Viterbi algorithm.
Figure 7:
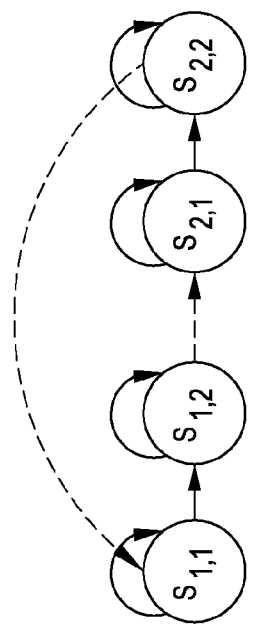

To robustly recognize actions from unreliable individual observations, the contextual constraints imposed by the Action Net may be used advantageously to formulate the action recognition and segmentation problem as finding the most likely sequence of nodes within the Action Net. The Viterbi algorithm may be a suitable tool for this task. See L. R. Rabiner, "A tutorial on Hidden Markov Models and selected applications in speech recognition", In *Proc. of the IEEE*, 77(2):257-286, 1989. The example shown in FIG. 7 illustrates how the Viterbi algorithm may be employed.

Consider the Action Net in FIG. 7(a) and the corresponding array of matching scores in FIG. 7(b). The goal may be to find a path (called the Viterbi Path) through the array from left to right that has the maximum sum of matching scores.

FIG. 7(a) illustrates a simplified Action Net which consists of two simple action models. A more complex Action Net, including an unrolled Action Net, may be used instead.

As reflected in FIG. 7(b), the Viterbi algorithm may find the most likely sequence of 2D poses (and thus actions) called the Viterbi Path. Each element (i, t) of this 2D array may keep three values: the matching score (on top) between node i in the Action Net and input frame t, the best score (on bottom) along a path up to (i, t) and the previous element on this path. At time t, element (i, t) may look at every node that links to node i in the Action Net and choose the one with the maximum path score. Element (i, t) may then link itself to this path. The path score may then be updated by adding its own matching score and records the previous element. When the last frame has been processed, the element with the maximum path score may be found and the Viterbi Path (in bold) may be back tracked. The complexity of the Viterbi algorithm for a fully ergodic graph model may be O(N2T), where N is the number of nodes in the graph and T is the number of frames. For an Action Net, because the average in-degree of each node may be small, the overall complexity may reduce to O(NT).

Further details about the Viterbi algorithm may be found in L. R. Rabiner, "A tutorial on Hidden Markov Models and selected applications in speech recognition", In *Proc. of the IEEE*, 77(2):257-286, 1989.

A uniform transitional probability may be assumed for each link (and thus neglected) of the Action Net. This may be because modeling transitional probability for each link of such a complex graph (with thousands of links) may require a huge training set, which may not be applicable in practice.

Experimental Results

Figure 8:
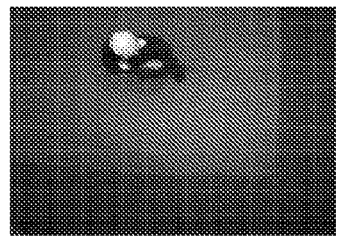
FIGS. 8(a)-8(e) illustrate images of test subjects taken from different viewpoints.
Figure 8:
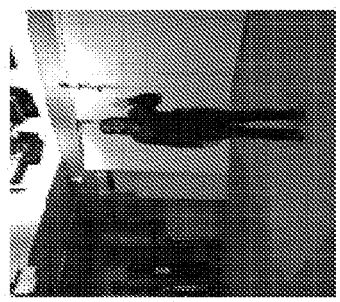
Figure 8:
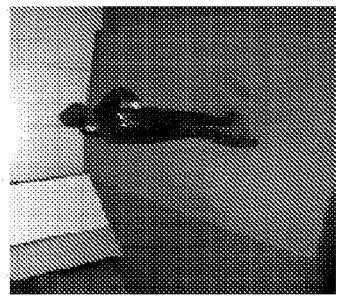
Figure 8:
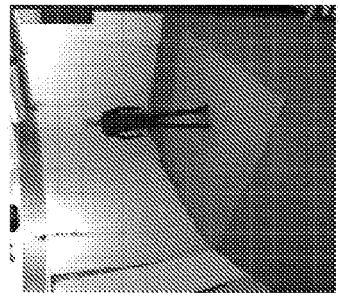
Figure 8:
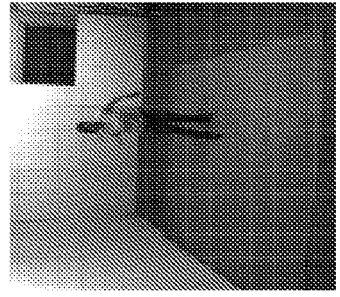

The proposed approach was demonstrated on a public video set obtained from Xmas Motion Acquisition. This set contained 180 video clips (36 shots taken from 5 cameras) of one of 12 actors performing 15 action classes. The average length of a clip was 1165 frames. One example from each camera is shown in FIG. 8. The actors freely chose their position and orientation in these clips. The order and the number of action instances performed in each clip varied. The large number of action classes and the large variance in viewpoints and subjects (and thus the execution styles) made action recognition challenging.

Figure 9:
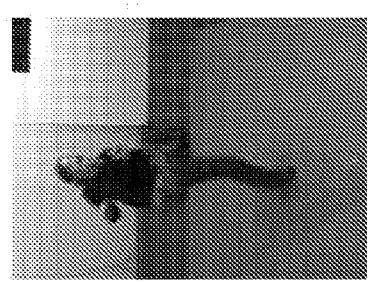
FIGS. 9(a)-(d) illustrate defects in extracted blobs that may occur.
Figure 9:
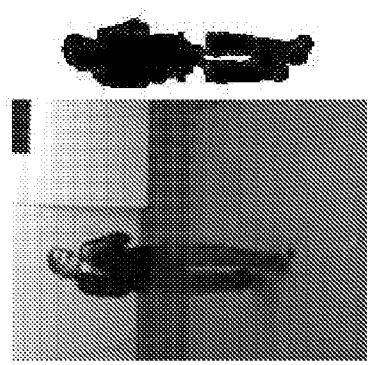
Figure 9:
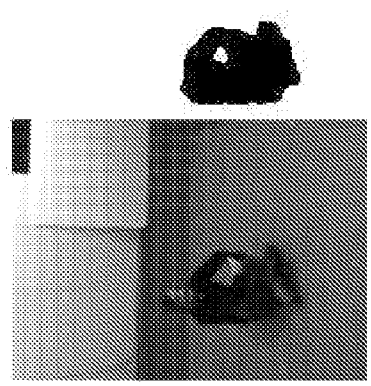
Figure 9:
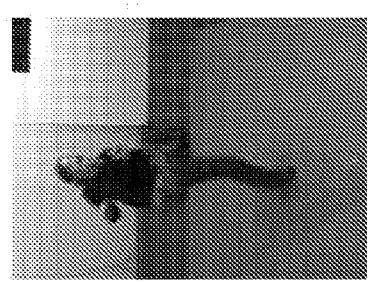

Human blobs were provided with the dataset. The quality of these blobs was generally good, but many defects were also present. FIG. 9 provides examples. Morphological closing operation was applied to repairing some of the defects, but this was ineffective for the severely contaminated blobs.

The 15 included action classes are listed in the first column of this table:

| Action | c1 | c2 | c3 | c4 | c5 | Overall |
|---|---|---|---|---|---|---|
| stand still | 73.9 | 71.2 | 68.9 | 73.5 | 70.1 | 71.1 |
| check watch | 82.8 | 82.1 | 81.9 | 84.2 | 81.4 | 82.5 |
| cross arms | 83.2 | 84.3 | 79.9 | 84.4 | 80.6 | 82.1 |
| scratch head | 81.1 | 81.5 | 80.1 | 80.6 | 77.1 | 80.2 |
| sit down | 86.3 | 85.3 | 83.2 | 82.1 | 81.4 | 83.7 |
| get up | 85.8 | 86.7 | 82.5 | 84.4 | 79.1 | 84.3 |
| turn around | 81.1 | 80 | 80.5 | 78.9 | 75.3 | 78.8 |
| walk in a circle | 79.2 | 83.3 | 79.3 | 79.8 | 74.4 | 79.7 |
| wave a hand | 80.2 | 82.3 | 77.6 | 81.3 | 78.1 | 79.9 |
| punch | 87.1 | 87.7 | 84.4 | 88.3 | 84.6 | 86.8 |
| kick | 89.1 | 89.6 | 83.3 | 89.4 | 85.3 | 87.7 |
| point | 81.5 | 83.6 | 87.1 | 80.2 | 79.5 | 82.7 |
| pick up | 83.8 | 85.9 | 84 | 85.1 | 79.4 | 83.2 |
| throw over head | 81.6 | 82.3 | 78.9 | 80.1 | 83.3 | 81.3 |
| throw from bottom | 80.1 | 81.9 | 81.5 | 82.4 | 85.4 | 82.4 |
| Overall | 81.5 | 82.1 | 80.1 | 81.3 | 78.4 | 80.6 |

Figure 10:
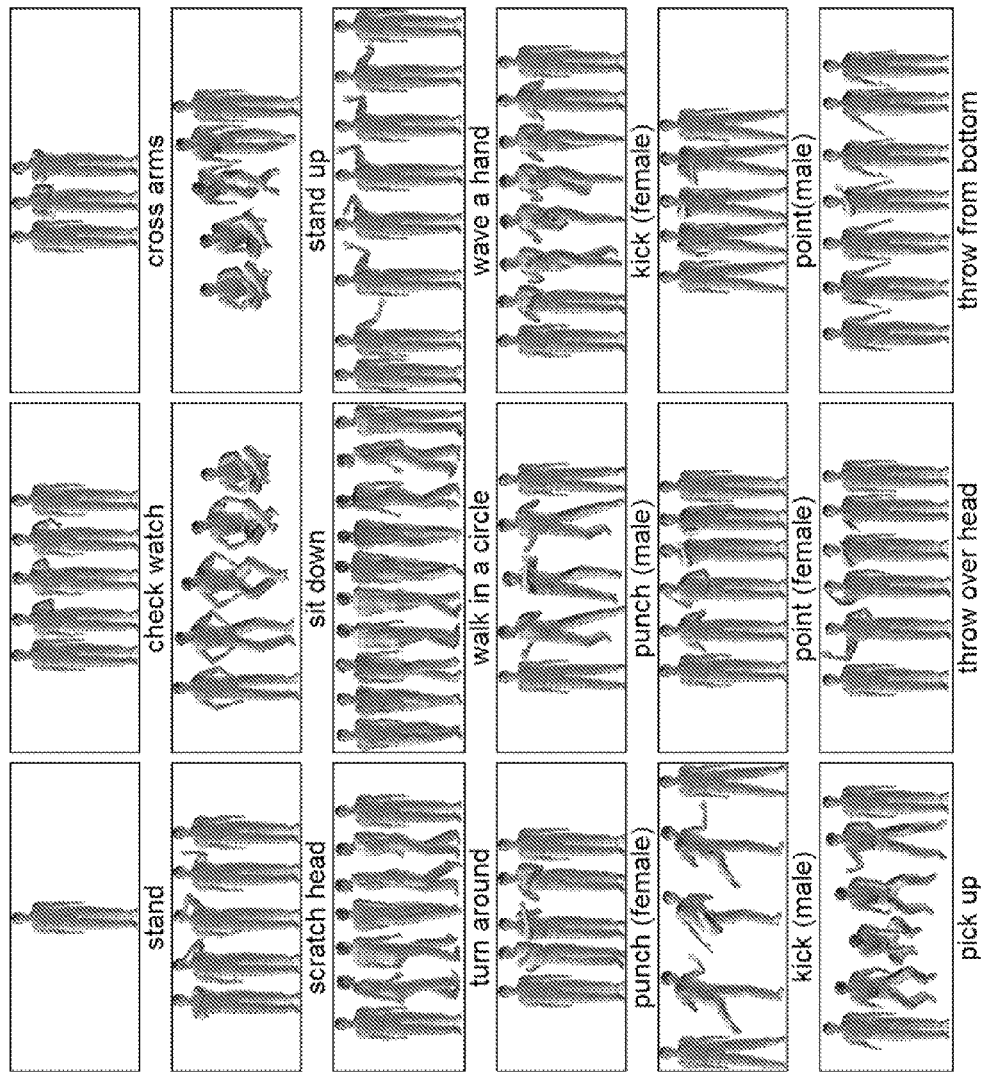
FIG. 10 illustrates extracted sequences of key poses for each of several different actions.

Based on the observation of actions performed by two actors (one male and one female), motion capture sequences were manually selected with the motions similar to the observed actions from a large motion capture database. The extracted key poses for each action class are shown in FIG. 10. Videos of both male and female actors were included, because their execution styles in actions such as "punch" and "kick" were significantly different. Such variance was handled using different action models. As seen in FIG. 10, "punch", "kick," and "point" each has two models. The symmetric counterparts of some actions (e.g. "wave left hand" for "wave right hand") were also included (not shown in the figure). In total, there were 177 key poses. Cameras were calibrated with a known tilt angle. Each key pose was therefore rendered from 36 pan angles. So the unrolled Action Net (for each camera) had 6372 nodes. The shape contexts of the 2D silhouettes were computed and stored in these nodes.

Figure 11:
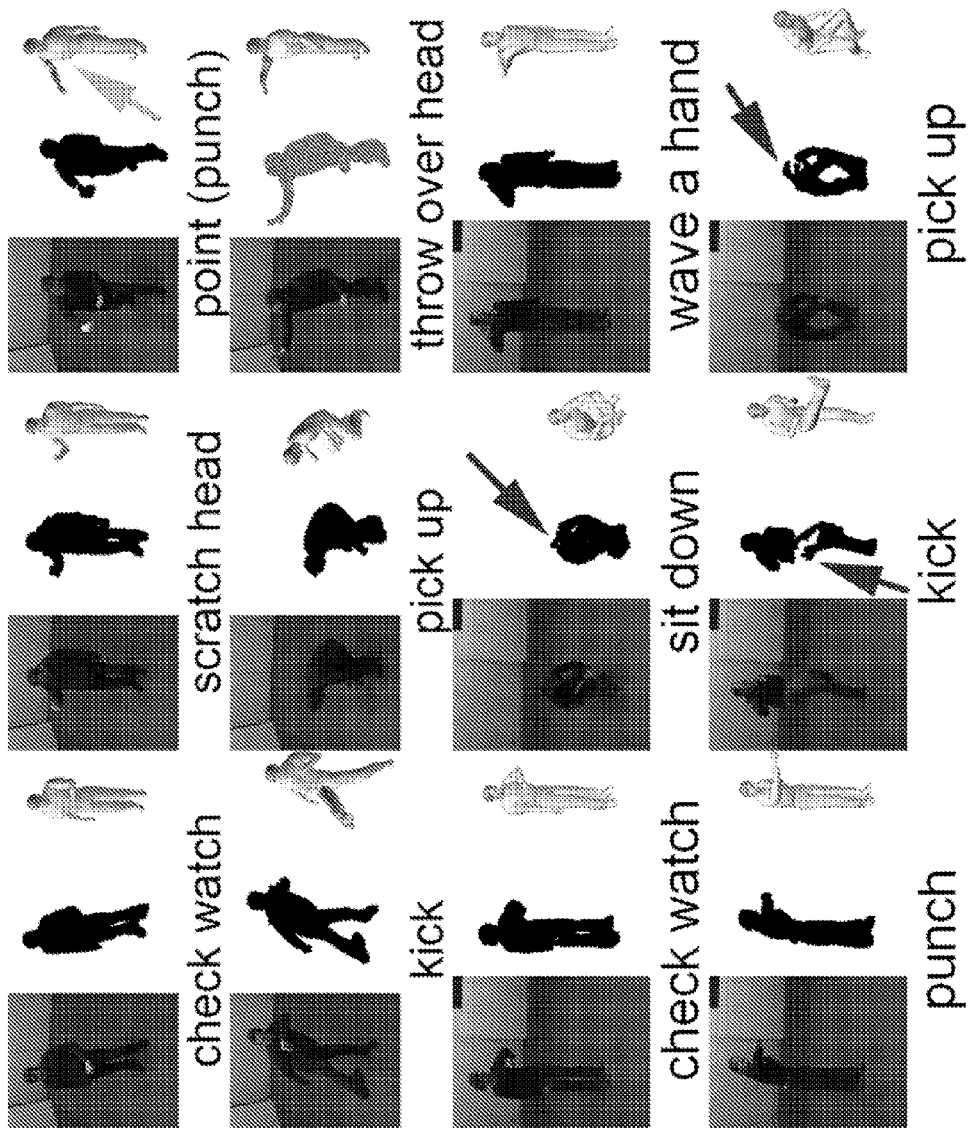
FIG. 11 illustrates results of matching 2D input image data representing sequential series of input images of a human performing various actions with linked sequences of key poses.

This system was tested on 50 videos clips of the 10 actors that were not included in the training data. The total length of these clips (10 actors×5 cameras) was more than 58,000 frames. For each clip, after the best action sequence was tracked, the resulting action label was compared at each frame with the provided ground truth. The recognition rate was defined as the percentage of correctly labeled frames. The recognition rate for each action class from each camera as well as the overall recognition rate are listed in the table above. Some result frames are shown in FIG. 11.

Each example shows the original image, the provided human blob, the recovered pose and the action label, respectively. Due to the contextual constraints, the approach may not be sensitive to the short-term defects in human blobs, as indicated by the dash-dotted arrows. The dotted arrow shows one failed example, in which a punching action is recognized as pointing. Those two actions, however, do appear similar.

This approach achieved an overall action recognition rate of 80.6% using a single camera. In Weinland, Ronfard, and Boyer report a higher action classification rate (93.3%) on the same dataset. See D. Weinland, R. Ronfard, and E. Boyer "Free Viewpoint Action Recognition using Motion History Volumes", CVIU, 103(2-3), pp. 249-257, 2006, Weinland et al. However, they used all five cameras to build visual hulls and classified actions based on a 3D action representation called Motion History Volumes. Instrumenting with many cameras, each highly calibrated, may not be not feasible for many applications, and reconstruction of 3D shape from multiple views may be computationally expensive.

The results show that among all 15 action classes, "kick" and "punch" seem to be the easiest actions to recognize. This may be because the motion in these two actions is more noticeable than in other actions. The high scores for "sit down," "get up," and "pick up" can also be attributed to this reason. Some arm related actions such as "scratch head," "wave a hand," and "throw over head" received relatively low scores, mostly because they have several (similar) key poses in common. The same explanation appears to apply to "walk in a circle" and "turn around. "Stand still" received the lowest score. This is not surprising because it has only one key pose and this key pose is similar to the boundary key poses of other actions, such as the starting key pose of "turn around" and the ending key pose of "get up." So there may not be a clear cut difference between "stand" and these actions.

The performance in general is consistent with respect to the camera viewpoints, but there are some notable differences. For example, two "throw" actions were better recognized in camera 5 because the motion appears more salient in this viewpoint. The performance for "sit down" and "get up" in camera 5 was lower than average for the opposite reason.

To justify the use of the PMK-NUP and Viterbi Path searching, the following approaches were tested using the same experimental setup: (1) Original PMK only, (2) PMKNUP only, (3) Original PMK with Viterbi. For the first two approaches, at each frame, the action label of the pose with the largest matching score was selected. The overall recognition rates of these approaches are listed in this table:

|  | Original PMK | PMK-NUP |
|---|---|---|
| without Action Net | 38.4% | 44.1% |
| with Action Net | 56.7% | 80.6% |

After applying the Action Net, PMK-NUP may perform significantly better than the original PMK (from 44.1% to 80.6%). This may be because for each input frame, the original PMK and PMKNUP may find the same best matched pose. However, the difference between a good match and a bad match in PMK-NUP may be larger than in the original PMK. When combined with Viterbi Path searching, this difference in PMK-NUP may be amplified over time and may finally make the best pose sequence easily recognizable. The effectiveness of the Action Net may be seen from this comparison.

The system ran at 5.1 frames/sec on a single P4 3 GHz CPU. Most of the CPU time was spent on silhouette matching. Because silhouette matches were computed independently, this system may be easily paralleled to give a real time speed.

Any type of computer system may be used to implement the various process steps and algorithms which have been described above. For example, a computer system having a computer memory system and a computer processing system may be used.

The computer memory system may be of any type. It may include one or more hard drives, CDs, DVDs, flash memories, ROMS, PROMS, and/or RAMS. It may be configured to store and may store the various image data and computational results that have been described, including the Action Net. The computer memory system may also be configured to store and may store one or more computer programs that are configured to implement each of the process steps and algorithms which have been described above.

The computer processing system may be of any type. It may include one or more microprocessors or other types of computer processing devices, input/output devices, and/or related computational systems. The computer processing system may be configured to implement each of the process steps and algorithms which have been described above. The computer processing system may include one or more computer programs which are configured to implement these process steps and algorithms in conjunction with one or more hardware devices.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. An automated human action recognition system for automatically recognizing one or more actions of a human from 2D input image data representing a sequential series of input images of the human performing the one or more actions from the same viewpoint, each input image being represented by 2D image data, the system comprising:

a computer memory system that includes computer hardware and contains 2D reference image data representing a plurality of reference actions performed by a human, wherein the 2D reference image data includes a plurality of linked sequences of key poses, including a linked sequence of key poses for each reference action, and for each reference action:

each key pose within the linked sequence of key poses for the reference action consists essentially of 2D image data that is representative of a human figure performing the reference action at a selected point during the reference action;

timing of each selected point within the linked sequence of key poses for the reference action is based on changes in position of the human figure during the performance of the reference action; and the linked sequence of key poses for the reference action uniquely distinguish the reference action from the linked sequence of key poses for all of the other reference actions; and a computer processing system that includes computer hardware and that is configured to determine which of the linked sequences best matches the 2D input image data, wherein:

the computer processing system is configured to automatically select each selected point by analyzing three-dimensional image data that is representative of a human figure performing each of the reference actions;

the computer processing system is configured to correlate each selected point with a time when computed motion energy of the human figure during the performance of each reference action is at a peak or at a valley, and to cause the sequence of the selected points in each linked sequence for each reference action to alternate between a time when the computed motion energy is at a peak and a time when the computed motion energy is at a valley;

one of the linked sequences includes a link between the key pose at the end of another linked sequence for a first of the reference actions to the key pose at the beginning of a still further linked sequence for a second of the reference actions; or the computer processing system is configured to determine which of the linked sequences best matches the 2D input image data by, in part, determining how well each input image matches each key pose, and to utilize a modified PMK algorithm to determine how well each input image matches each key pose.

2. The automated human action recognition system of claim 1 wherein the selected points for the key poses within the linked sequence for at least one of the reference actions are not equally spaced in time.

3. The automated human action recognition system of claim 1 wherein at least one of the key poses is contained within a plurality of the linked sequences.

4. The automated human action recognition system of claim 1 wherein each linked sequence for each of the reference actions contains less than ten key poses.

5. The automated human action recognition system of claim 1 wherein the computer processing system is configured to automatically select each selected point.

6. The automated human action recognition system of claim 5 wherein the computer processing system is configured to automatically select each selected point by analyzing three-dimensional image data that is representative of a human figure performing each of the reference actions.

7. The automated human action recognition system of claim 5 wherein the computer processing system is configured to correlate each selected point with a time when computed motion energy of the human figure during the performance of each reference action is at a peak or at a valley.

8. The automated human action recognition system of claim 7 wherein the computer processing system is configured to cause the sequence of the selected points in each linked sequence for each reference action to alternate between a time when the computed motion energy is at a peak and a time when the computed motion energy is at a valley.

9. The automated human action recognition system of claim 1 wherein the linked sequences include a plurality of linked sequences of key poses for each reference action, each from a different viewpoint.

10. The automated human action recognition system of claim 9 wherein the different viewpoints are from a common location, but at different pans.

11. The automated human action recognition system of claim 9 wherein the different viewpoints are from a common location, but at different tilts.

12. The automated human action recognition system of claim 9 wherein the computer processing system is configured to determine which linked sequence best matches the 2D input image data with no knowledge of the viewpoint of the 2D input image data.

13. The automated human action recognition system of claim 1 wherein each linked sequence of key poses includes a link from each key pose within the linked sequence to the same linked sequence.

14. The automated human action recognition system of claim 1 wherein the linked sequence of key poses for one of the reference actions includes a beginning and end key pose and a link from the key pose at the end of the reference action to the key pose at the beginning of the reference action.

15. The automated human action recognition system of claim 14 wherein the reference action is sometimes repeated in real life.

16. The automated human action recognition system of claim 1 wherein one of the linked sequences includes the link between the key pose at the end of the another linked sequence for the first of the reference actions to the key pose at the beginning of the still further linked sequence for the second of the reference actions.

17. The automated human action recognition system of claim 16 wherein the second reference action sometimes follows the first reference action in real life.

18. The automated human action recognition system of claim 1 wherein each of the linked sequences of key poses for each of the reference actions includes a link to another linked sequence of key poses for the reference action, but from a neighboring viewpoint.

19. The automated human action recognition system of claim 1 wherein the human figure is a synthesized human figure.

20. The automated human action recognition system of claim 1 wherein the 2D data for each key pose is representative of a silhouette of the human figure.

21. The automated human action recognition system of claim 20 wherein each silhouette has a scale and the scale and translation of each silhouette has been normalized in the 2D data for each pose.

22. The automated human action recognition system of claim 1 wherein the computer processing system is configured to determine which of the linked sequences best matches the 2D input image data by, in part, determining how well each input image matches each key pose.

23. The automated human action recognition system of claim 22 wherein the computer processing system is configured to utilize the modified PMK algorithm to determine how well each input image matches each key pose.

24. The automated human action recognition system of claim 23 wherein:
each input image and each key pose is represented by 2D data that provides a value for each of a plurality of characteristics of each input image; and
the modified PMK algorithm uses a scale factor in connection with each characteristic for both images that is based on a range of values for each characteristic.

25. The automated human action recognition system of claim 1 wherein the computer processing system is configured to utilize the Viterbi algorithm in determining the linked sequences best matches the 2D input image data.

* * * * *